United States Patent [19]

Stricklen et al.

[11] Patent Number: 5,115,054
[45] Date of Patent: May 19, 1992

[54] CATALYSTS CONTAINING POLY(3-ETHYL-1-HEXENE) AND USES THEREOF

[75] Inventors: Phil M. Stricklen; Francis X. Mueller, Jr.; Kenneth W. Willcox; Joyce K. Snow, all of Bartlesville, Okla.

[73] Assignee: Phillips Petroleum Company, Bartlesville, Okla.

[21] Appl. No.: 597,458

[22] Filed: Oct. 12, 1990

[51] Int. Cl.⁵ .............................. C08F 4/64
[52] U.S. Cl. ............................... 526/159; 526/348.2; 526/348.4; 502/108
[58] Field of Search .................. 526/159, 348.2, 348.4

[56] References Cited

U.S. PATENT DOCUMENTS

| | | | |
|---|---|---|---|
| 3,029,215 | 4/1962 | Campbell | 260/33.6 |
| 3,228,921 | 1/1966 | Gumboldt et al. | 260/88.2 |
| 3,264,277 | 8/1966 | Winkler et al. | 260/93.7 |
| 3,513,140 | 5/1970 | Hambling et al. | 260/80.78 |
| 3,562,241 | 2/1971 | Witt | 260/94.9 |
| 3,686,155 | 8/1972 | Wagensommer | 260/88.2 |
| 3,755,500 | 8/1973 | Clark | 260/878 R |
| 4,129,632 | 12/1978 | Olson et al. | 264/40.1 |
| 4,146,591 | 3/1979 | Fukui et al. | 260/878 B |
| 4,295,991 | 10/1981 | Wristers | 526/119 X |
| 4,325,837 | 4/1982 | Capshew et al. | 252/429 B |
| 4,436,609 | 3/1984 | Sobieniak | 204/267 |
| 4,659,792 | 4/1987 | Kashiwa et al. | 526/73 |
| 4,692,480 | 9/1987 | Takahashi et al. | 523/218 |
| 4,798,866 | 1/1989 | Yoshitake et al. | 525/191 |

OTHER PUBLICATIONS

"Transparent Polymers From 4-methylpentene-1", S.C.I. Monograph No. 20, pp. 82-99, K. J. Clark et al.

*Primary Examiner*—Patrick P. Garvin
*Attorney, Agent, or Firm*—Carl D. Corvin

[57] ABSTRACT

Prepolymer-containing catalysts compositions and processes for making and using such catalyst are disclosed. These catalysts compositions are particularly useful for polymerizing 4-methyl-1-pentene to poly(4-methyl-1-pentene) and to improve the optical properties of polyolefins.

4 Claims, No Drawings

CATALYSTS CONTAINING POLY(3-ETHYL-1-HEXENE) AND USES THEREOF

BACKGROUND OF THE INVENTION

This invention relates to polyolefins. In particular, this invention relates to new compositions of polyolefins, processes for making these compositions, catalysts for making these compositions and the uses of these polyolefins.

Polyolefin compositions and various processes for making these compositions are known in the art. However, because of the unique characteristics of various polyolefin compositions, and the unique applications for which these polyolefins are variably suitable, interest in these materials remain a constant feature of the plastics industry and its numerous customers.

It is likewise known in the art that the occurrence of haze is a common but undesirable problem with polyolefins. Consequently, the use of these polyolefins in some applications, is hindered.

Thus, new polyolefin compositions with unique properties, the processes for making these compositions, new uses for these compositions, or even improvements of existing compositions and/or processes are always of interest and value to the plastics industry in particular, and to society in general. Additionally, a solution to the haze problem that occurs with polyolefins will be a contribution to the art.

SUMMARY OF THE INVENTION

It is an object of the invention to provide new polyolefin compositions and/or processes for making such compositions.

It is a further object of this invention to provide a catalyst suitable for producing polyolefins having good optical properties.

It is a further object of this invention to provide polymers of 4-methyl-1-pentene having improved clarity.

In a first embodiment of this invention, a unique prepolymer-containing catalyst composition consisting of poly(3-ethyl-1-hexene) (PEH) and an olefin polymerization catalyst is provided.

In a second embodiment of this invention, a process is provided for making the prepolymer-containing catalyst of the invention.

In a third embodiment of this invention, a process is provided using the prepolymer-containing catalyst of the invention to polymerize 4-methyl-1-pentene (4MP1) to poly(4-methyl-1-pentene) (PMP).

In a fourth embodiment of this invention, a process is provided for improving the optical properties of polyolefins using the prepolymer or the prepolymer-containing catalysts of the invention.

In a fifth embodiment of this invention a prepolymerization catalyst composition consisting of a copolymer of 3-ethyl-1-hexene and at least one more reactive olefin and an olefin polymerization catalyst is provided.

DETAILED DESCRIPTION OF THE INVENTION

In very generalized terms, the practice of this invention involves prepolymerizing 3-ethyl-1-hexene (3EH1) on a suitable catalyst, and thereafter utilizing the thus produced prepolymer-containing catalyst to polymerize 4MP1 to PMP which has and exhibits improved optical properties. Still generally speaking the use of one or more reactive olefins in conjunction with the 3EH1 results in the additional advantage of increased rates of formation of the prepolymer catalyst.

The production of the poly (3EH1) prepolymer catalyst, which is the first step in the practice of this invention, generally utilizes the following ingredients: 3-ethyl-1-hexene, a suitable catalyst and co-catalyst, and optionally a suitable olefin comonomer, a chain transfer agent, and a suitable solvent.

By the term suitable catalyst is meant a catalyst capable of polymerizing 1-olefins. These catalysts can be either supported or unsupported. Examples of transition metal components of such catalysts include compounds of titanium, vanadium, and zirconium. Unsupported titanium trichloride is the preferred member of this group.

Co-catalysts that are useful in the practice of this invention are organoaluminum compounds which can be represented by the general chemical formula $Al(R)_a(X)_b$:

where $a+b=3$; $a=1$ to 3; and $b=0$ to 2;

R is a hydrocarbon radical with 1 to 10 carbon atoms; and

X is a halide such as Cl, Br, or I.

Preferred co-catalysts are diethylaluminum chloride, and triethyl aluminum.

Thus, the catalyst/co-catalyst system useful in the practice of this invention, preferably, comprises of titanium halide/organo-aluminium. Most preferably, the catalyst/co-catalyst system of this invention comprises of unsupported titanium trichloride/diethylaluminium chloride.

By the term suitable olefin comonomer is meant an olefin which is more reactive than 3EH1 monomer. Such an olefin can contain 2 to 20 carbon atoms and can either be branched or linear. Examples of such olefins include but are not limited to, 3-methyl-1-butene, 3-methyl-1-pentene, 3-methyl-1-hexene, 3-methyl-1-octene, 4-methyl-1-pentene, 4-methyl-1-hexene, 5-methyl-1-hexene, 3-ethyl-1-pentene, 3-ethyl-1-octene, 3,3-dimethyl-1-pentene, 4,4-dimethyl-1-pentene, 3,4-dimethyl-1-pentene, 3,3-dimethyl-1-hexene, 4,4-dimethyl-1-hexene, 3,4-dimethyl-1-hexene, 3-methyl-4-ethyl-1-hexene, allylcyclopentane, ethylene, propylene, 1-butene, 1-hexene, 1-octene, 1-decene, 1-hexadecene, and 1-octadecene.

The more reactive olefins herein disclosed is generally present as a minor component of the comonomers mixture, with 3EH1 present as the major component. In numerical terms, the more reactive comonomer is present within a broad ratio of from about 1:1 to about 1:100, with a preferred ratio of about 1:25 of comonomer to 3EH1. Thus, by "3-ethyl-1-hexene prepolymer" is meant either poly(3EH1) homopolymer or the copolymers just described.

When unsupported titanium trichloride is used as the catalyst, diethylaluminum chloride is the preferred co-catalyst. Alternatively, when either supported vanadium, titanium, or zirconium is used as the catalyst, triethyl aluminum is the preferred co-catalyst. Furthermore, using supported titanium, vanadium or zirconium catalyst may require the use of a stereoregulator.

Suitable diluents useful in the practice of this invention generally include all hydrocarbon solvents. Preferred, however, are the aliphatic and cycloaliphatic hydrocarbons. Examples of these diluents include butane, pentane, heptane, cyclohexane, methylcyclohexane, or mixtures thereof.

All chain transfer agents are suitable in the practice of this invention. These agents, have in common, the ability to control the molecular weight of the polymer(s) formed during prepolymerization or polymerization. A preferred member of this class is hydrogen. It is noted, though, that the utilization of these agents is optional, especially during the preparation of the prepolymer-containing catalyst.

In preparing the prepolymer-containing catalyst of this invention, it is recommended that the useful ingredients be employed in the following quantities: For the catalyst to co-catalyst, a broad ratio of about 1:1 to about 1:10, with a preferred ratio of 1:3. The catalyst to the monomer can be utilized within a broad ratio of from about 1:1 to about 1:50, with a preferred ratio of 1:10.

The quantity of diluent used should be sufficient to maintain the reaction in a slurry phase until completion.

The following reaction conditions are appropriate for the practice of preparing the prepolymerized catalyst of this invention: Temperature can range from about $-20°$ C. to about 200° C., with a preferred range of $-10°$ C. to 120° C., and a most preferred range of 0° C. to 100° C. A pressure range of from about atmospheric to about 50 atmospheres is appropriate. Reaction time is directly proportional to the quantity of monomer used. The desired goal is to allow sufficient time for the reaction to be completed. Quantitatively stated this desired goal generally requires a time period of about 1 hour to about 4 days, with a preferred time period of from about 24 hours to 48 hours.

While the order of adding and/or mixing the ingredients is not critical, the following order is preferred: Introducing the catalyst into a reaction vessel, followed by introducing the diluent, co-catalyst, chain transfer agent, and monomer respectively.

When it is desired to make the copolymerized prepolymer-containing catalyst, one or more of the more reactive olefins should be added in conjunction, before, or after the introduction of 3EH1 into the reaction vessel.

While this preferred order can be varied, such variations as would result to introducing the catalyst and co-catalyst in the absence of a diluent, are not recommended.

In a nutshell, mixing in the preferred order, the above recited ingredients, in the above recited quantities, under the above recited conditions, leads to the production of the prepolymer-containing catalyst of this invention. The thus prepared catalyst can be used without the need for purification. However, it is preferred that the product catalyst be filtered, washed with a hydrocarbon diluent, and dried to evaporate the diluent. The prepolymerized catalyst product produced in a manner disclosed by this invention, weighs about the same as the combined weight of the monomer and catalyst used in its preparation.

The thus produced prepolymer-containing catalyst has an amount of prepolymer effective to enhance its catalytic activity. Generally, this amount of prepolymer is present within a broad range of from about 1 to about 98 weight percent; with a preferred range of about 40 to 80 weight percent; and a distinctly preferred range of about 60 to 70 weight percent based on the combined weight of the prepolymer and the catalyst.

The third embodiment of this invention involves utilizing the inventive prepolymer-containing catalyst to polymerize 4MP1 to PMP.

The practice of this aspect of the invention generally utilizes the same co-catalysts as in the prepolymerization step. It is expressly noted that usage of the same co-catalyst for all steps of the invention is preferred.

Likewise, the same chain transfer agents, and optionally diluents and stereoregulators as previously recited, are useful for the practice of this aspect of the invention. It is noted that the 4-methyl-1-pentene can also serve as the optional diluent.

Other ancillary ingredients useful in the practice of this invention include but are not limited to deactivating reagents for the catalyst, deashing reagents, suitable stabilizers, and/or additives. These ingredients, their uses, methods and suitable quantities to be used, are well known in the art. A preferred system of deashing chemicals is a mixture of a substantially equal volume of propylene oxide and acetyl acetone.

It has been discovered that the ingredients useful to carry out the polymerization reaction of this invention, are best mixed in certain predetermined quantities, and under certain predetermined reaction conditions. The catalyst to co-catalyst can be used in the same quantities as previously disclosed. The catalyst to 4MP1 monomer can be used within the range of about 1:20 to about 1:4000. Generally speaking though, the quantity of PMP desired to be produced determines the quantities of 4MP1 and of the catalyst to be used.

The pressure required during polymerization is the same as previously disclosed. The polymerization can be conducted at a temperature within the range of from about 20° C. to about 200° C., with a preferred temperature range of 30° C. to 80° C., and a most preferred temperature range of 45° C. to 75° C. Polymerization can last from about 5 minutes to about 24 hours, with a preferred time of about 1 to 4 hours.

This polymerization of 4MP1 using a prepolymerized catalyst can be carried out in a gas phase, solution phase, or as a slurry. The slurry process is preferred. Polymerization is accomplished by using conventional equipments and techniques.

When the polymerization reaction has reached the desired degree of completion, a deactivating agent is introduced into the reaction vessel to deactivate the catalyst. If an unsupported catalyst was used, deashing with propylene oxide-acetyl acetone mixture is highly recommended.

Upon completion of these processes, sufficient quantities of suitable stabilizers can then be added, the PMP of the invention can then be separated from any unreacted 4MP1, and can then be washed and dried.

The PMP produced by the method of this invention has a melt flow of between 0.01 to 100 using a 5 Kg weight sample at 260° C. and ASTM method 1238-57T. A preferred melt flow is between 1 to 100, while a most preferred melt flow is between 5 to 30. The melting and freezing point of the thus produced PMP can be determined by Differential Scanning Calorimetry (DSC).

It is the fourth embodiment of this invention that the PMP thus produced has and exhibits improved optical properties. By improved optical properties as used herein, is meant an improvement over polymer (PMP) made from the same monomer under equivalent conditions with the same catalyst except for the absence of the prepolymer. Stated otherwise, polymer with improved optical properties refers to polymer (PMP) which is a beneficiary of the nucleating materials and/or processes of this invention. This improvement in optical properties is largely attributable to the usage of poly (3EHI) during the processes disclosed herein.

It is theorized that because PEH melts at about 430° C., it remains unmelted at temperatures required for the processing of PMP. The unmelted PEH then acts as a nucleating agent for the PMP. It is further theorized that the nucleating effect of PEH facilitates/accelerates formation of PMP crystallites, and creates numerous nucleation centers, which in turn help to control crystallite size. The nucleation of the PMP by PEH or a copolymer comprising PEH, causes the PMP to crystallize at a higher temperature. This in turn reduces the supercooling of the nucleated PMP relative to the non-nucleated PMP. [Supercooling as used herein refers to the temperature difference between the melting temperature and the freezing temperature of the PMP polymer]. It is believed that crystallite size controlled by this additive nucleation effect is less than 0.5 microns.

In order for this enhanced nucleation reaction to occur, PEH should be present in the polymer produced with the prepolymer-containing catalyst in a quantity sufficient to induce PMP nucleation, but not enough to cause the formation of crystallites large enough to interfere with visible light. Quantitatively, PEH should be present in an amount which is less than 5%, and preferably less than 1% by weight of the total composition. Generally 0.1 to 0.5 weight percent PEH is utilized.

This improvement in optical properties over polymers made in an identical manner except for the presence of the prepolymer on the catalyst can be illustrated by measuring the haze of the PMP produced.

The fifth embodiment of this invention involves producing a catalyst consisting of a copolymer 3-ethyl-1-hexene and one or more olefin selected from the list disclosed in the specification. This process can utilize the conditions and/or conventional additives previously discussed. During this preparation, the ratio of comonomer to 3EH1 can be within the range of from about 1:1 to about 1:100, with a preferred ratio of about 1:25.

The following illustrative examples further detail the various aspects of this invention.

EXAMPLE 1

Preparation of Prepolymer Catalyst

To a 200 mL crown capped bottle containing a magnetic stirring bar was charged 2.0 g of $TiCl_3$. The bottle was capped while under an atmosphere of nitrogen. The bottle was then charged with 5.0 g of diethylaluminum chloride as a 25% by weight solution in n-heptane. While stirring, 0.177 g of 3-ethyl-1-hexene was then charged to the bottle. The stirring was continued for 48 hours at room temperature. The bottle was opened in a nitrogen filled dry box. The catalyst was filtered, washed 3 times with n-heptane and allowed to dry in the dry box overnight. The dry prepolymer catalyst weighed 2.16 g.

EXAMPLES 2 AND 3

The same procedure as in Example 1 was used in these examples, except that the 3EHI monomer charge was increased. The amounts of monomer charged and prepolymer catalyst recovered are as shown in Table 1.

TABLE 1

| Example No. | Grams $TiCl_3$ | Grams 3-ethyl-1-hexene | Weight of Prepolymerized Catalyst |
|---|---|---|---|
| 1 | 2.0 | 0.77 | 2.27 |
| 2 | 2.0 | 2.18 | 3.17 |
| 3 | 2.0 | 6.62 | 5.87 |

EXAMPLE 4

Polymerization of 4-methyl-1-pentene

A 1-gallon autoclave reactor was purged with nitrogen to remove all traces of oxygen and water. The reactor was charged with 2000 g of 4-methyl-1-pentene, 33.3 g of 1-decene, 0.80 g of diethylaluminum chloride, 60 mmoles of hydrogen, and 0.137 g of the prepolymer catalyst prepared in Example 1. The reactants were stirred at 50° C. for 1 hour at which time the catalyst was deactivated with a solution consisting of 2.5 mLs of acetylacetone and 2.5 mLs of propylene oxide. The unreacted monomer was drained from the reactor. The polymer was washed in the reactor with 2.5 liters of n-heptane. The polymer was then washed with 2 liters of methanol and isolated by filtration. Butylated hydroxy toluene (BHT) was added as an acetone solution to give 0.1 weight percent BHT in the polymer. The polymer was dried in a vacuum oven. The content of 1-decene comonomer, melting point, melt crystallization temperature, haze, and the supercooling (Tm-Tmc) were measured, and recorded as shown in Table 2.

EXAMPLES 5 AND 6

These polymerizations were run utilizing the same procedures as in Example 4 except the prepolymerized catalyst was different. The catalyst used and polymer properties are shown in Table 2.

COMPARATIVE EXAMPLE I 4-methyl-1-pentene was copolymerized with 1-decene in the same manner as in Example 4 except that the $TiCl_3$ catalyst did not contain prepolymer. The results of the copolymerization are shown in Table 2.

TABLE 2

| Example No. | Prepolymerized Catalyst From Example Nos. | Weight of Prepolymerized Catalyst Added | Weight of Polymer Isolated | 1-Decene Content in Polymer (mole %) | Activity of Catalyst g/Polymer $gTiCl_3$/hr | % Haze[a] | $Tm^b$ | $Tmc^c$ | Super-cooling Tm-Tmc |
|---|---|---|---|---|---|---|---|---|---|
| 4 | 1 | 0.137 | 120 | 2.8 | 993 | 27.6 | 229 | 196 | 33 |
| 5 | 2 | 0.186 | 26 | 2.8 | 221 | 18.9 | 228 | 198 | 30 |
| 6 | 3 | 0.340 | 130 | 2.6 | 1121 | 15.8 | 225 | 202 | 23 |
| Comp. |  | 0.249 | 43 | 1.9 | 175 | [d] | 229 | 193 | 36 |

TABLE 2-continued

| Example No. | Prepolymerized Catalyst From Example Nos. | Weight of Prepolymerized Catalyst Added | Weight of Polymer Isolated | 1-Decene Content in Polymer (mole %) | Activity of Catalyst g/Polymer gTiCl$_3$/hr | % Haze[a] | Tm[b] | Tmc[c] | Supercooling Tm-Tmc |
|---|---|---|---|---|---|---|---|---|---|
| Ex. 1 | | | | | | | | | |

[a]ASTM method D1003 measured on ⅛ inch compression molded plaques.
[b]Melting temperature measured by DSC.
[c]Melt crystallization temperature measured by DSC.
[d]The haze value for Comparative Example 1 was inadvertently unrecorded. However, its supercooling value of 36 indicates that this unrecorded haze value will be greater than 27.6%. This is because high supercooling values also correlate with high haze values, consistent with the data in Table 2.

The results summarized in Table 2 show that as the quantity of prepolymer in the catalyst increased from 12% to 60% Examples Numbers 4-6, the percent haze decreased from 27.6% to 15.8%, and the supercooling also decreased from 33 to 23.

COMPARATIVE EXAMPLE 2

This example illustrates that in making a catalyst containing 3-ethyl-1-hexene, about 45 weight percent of the initial amount of 3-ethyl-1-hexene used, is incorporated into the final product.

5.14 grams of TiCl$_3$ was charged to a bottle in a nitrogen filled dry box. The bottle was sealed with a crown cap while in the dry box. To the capped bottle was added 25 mLs of n-heptane to act as a diluent and 22.48 g of a 15 weight percent solution of diethylaluminum chloride as the cocatalyst. The monomer for the prepolymer (17.86 g of 3-ethyl-1-hexene) was finally added and the bottle placed in an oil bath regulated at 50° and stirred magnetically for 48 hours. The prepolymer catalyst was filtered in a dry box and washed with 450 mLs of n-heptane and dried. The dry prepolymer catalyst weighed 13.13 grams representing a 45% conversion of the 3-ethyl-1-hexene monomer.

EXAMPLE 7

This example illustrates that the addition of a more reactive olefin to the ingredients of comparative Example 2, results in the incorporation of a greater amount of 3-ethyl-1-hexene into the final product. Thus, Comparative Example 2 is within the scope of this invention, giving good results, but Example 7 shows further improvement by virtue of the presence of the comonomer.

5.12 g of TiCl$_3$ catalyst was charged to a bottle in a nitrogen filled dry box. The bottle was sealed with a crown cap and removed from the dry box. The diluent (25 mLs of n-heptane) and the cocatalyst (22.16 g of 25% diethylaluminum chloride in n-heptane) were charged to the bottle via syringe. The 21.17 g of 3-ethyl-1-hexene was added and the bottle placed in an oil bath at 50° C. After 24 hours, 0.67 g of 4-methyl-1-pentene was added to the bottle. The prepolymerization was allowed to continue for an additional 24 hours before the prepolymer catalyst was filtered in the dry box. The prepolymer catalyst was washed with 500 mLs of n-heptane and allowed to dry. The dry prepolymer catalyst weighed 19.0 g representing a 64% conversion of the monomers. The addition of the more reactive 4-methyl-1-pentene monomer increased the conversion of 3-ethyl-1-hexene from 45 to 64% for the same reaction time.

While this invention has been described in detail for the purpose of illustration, it is not to be construed as limited thereby but is intended to cover all changes and modifications within the spirit and scope thereof.

That which is claimed is:

1. A process comprising contacting at least one olefin under polymerization conditions with a composition comprising 3-ethyl-1-hexene prepolymer a titanium trichloride catalyst and an organo Al cocatalyst to produce an olefin polymer having improved optical properties.

2. A process of making poly(4-methyl-1-pentene) comprising polymerizing 4-methyl-1-pentene with a catalyst essentially consisting of an organo Al cocatalyst and 3-ethyl-1-hexene prepolymer on unsupported titanium chloride.

3. A process as in claim 2 wherein said 3-ethyl-1-hexene prepolymer is a copolymer of a major amount of 3-ethyl-1-hexene and a minor amount of 4-methyl-1-pentene.

4. A process as in claim 2 wherein said 3-ethyl-1-hexene prepolymer is 3-ethyl-1-hexene homopolymer.

* * * * *